United States Patent [19]

Wolf et al.

[11] Patent Number: 4,776,573
[45] Date of Patent: Oct. 11, 1988

[54] SPRING ELEMENT

[75] Inventors: Franz J. Wolf; Hubert Pletsch, both of Bad Soden-Salmunster, Fed. Rep. of Germany

[73] Assignee: Woco Franz-Josef Wolf & Co., Fed. Rep. of Germany

[21] Appl. No.: 804,461

[22] Filed: Dec. 4, 1985

[30] Foreign Application Priority Data

Dec. 14, 1984 [DE] Fed. Rep. of Germany ... 8436702[U]
Jan. 18, 1985 [EP] European Pat. Off. ........ 85100529.8

[51] Int. Cl.$^4$ .............................................. F16F 9/10
[52] U.S. Cl. ................................... 267/140.1; 181/207; 248/562; 248/615; 248/634; 248/638; 267/140; 267/141; 267/153; 267/292
[58] Field of Search ............... 267/63 R, 141, 140.1, 267/153, 140; 248/634, 562, 615, 638; 181/288, 207

[56] References Cited

U.S. PATENT DOCUMENTS

| | | | |
|---|---|---|---|
| 2,727,738 | 12/1955 | Lindley | 267/63 R X |
| 3,191,896 | 6/1965 | Nathan | 267/153 X |
| 3,227,598 | 1/1966 | Robb | 181/288 X |
| 4,143,612 | 3/1979 | Ticknor | 267/140 X |

FOREIGN PATENT DOCUMENTS

| | | | |
|---|---|---|---|
| 723596 | 8/1942 | Fed. Rep. of Germany | 267/153 |
| 2405232 | 1/1975 | Fed. Rep. of Germany | 267/140 |
| 52-37675 | 3/1977 | Japan . | |
| 140465 | 6/1921 | United Kingdom | 248/358 |

OTHER PUBLICATIONS

Atkins, P. W., *Physical Chemistry*, W. H. Freeman & Co., San Francisco, pp. 534–535.

*Primary Examiner*—George E. A. Halvosa
*Attorney, Agent, or Firm*—Lowe, Price, LeBlanc, Becker & Shur

[57] ABSTRACT

A spring element comprises an elastomer block (5) interspersed with at least two sets of cylindrical or prismatic channels (1) which in turn intersect cavities (2) formed in the elastomer block (5), the greatest inside cross-section of which cavities in the plane located at right angles to the channel axis is greater than the cross-section of the channels in that plane, said sets of channels mutually crossing at different levels in space without mutually intersecting. By virtue of this mode of interspersing the elastomer spring element with cavities, an optimal distribution of compressive stresses in the spring element combined with an optimum acoustic damping are achieved.

5 Claims, 1 Drawing Sheet

SPRING ELEMENT

TECHNICAL FIELD

The invention relates to a spring element comprising a block made of a resilient elastomer materia, such as a rubber spring element, interspersed with channels of preferably cylindrical or prismatic cross-section. The channels in turn intersect cavities also formed in the block, the greatest inner diameter of which cavities in a plane located at right angles to the channel axis being greater than the cross-section of the channels in said plane. The ratio of the inner diameters of the cavities is in the range from 1:3 to 3:1, particularly in the range of or at least approximately 1:1 referring to the ratio of the cavities' diameter at right angles and parallel to the channel axis. The channels penetrate or intersect the cavities so that the center of the cavity lies right upon the central axis of the respective channel intersecting said cavity. All cavities interspersed by one and the same channel are equally spaced from each other with respect to the axis of the channel.

BACKGROUND OF THE INVENTION

Well-known bulk rubber spring elements are subject to limitations dictated by construction and material where relatively large masses or loads are required to be mounted with a relatively soft spring characteristic, i.e., with a flat proportionality range of the spring characteristics. Bulk rubber buffers tend to fail where the largest possible spring deflection is required for a given load. When using a massive bulk elastomer block, the elastomer material has to be adjusted to a relative soft value of hardness in order to achieve this object. For such a soft material, however, heavily loading such a buffer results in an intense bulging of the external contour of the buffer element at right angles to the vector of the load, a high and inhomogeneous concentration of stress in those external surfaces of the buffer element, low restoring force, creeping and fatigue due to material overloading are the consequences from such an effect. Additionally, acoustic waves propagate only too well through such a bulk rubber buffer, which acoustic damping effect is insufficient especially in the automotive arts.

SUMMARY OF THE INVENTION

Having regard to this prior art, it is an object of the invention to develop a spring element comprising a block made of a resilient elastomer material, which is on the one hand mechanically so strong, firm and stable that it can bear even major loads without damage, and, on the other hand, exhibits a definitely soft spring characteristic over a broad elastic range of proportionality without creeping, fatigue or subsidence, while simultaneously exhibiting ameliorated data for acoustic damping.

To achieve the above object, a spring element according to the invention comprises an elastomer block interspersed by at least two sets of mutually parallel hollow channels intersecting in turn hollow cavities, which channels cross each other three-dimensionally in different planes and do not mutually intersect, and which channels or channel sections exhibit an equal mutual angular interval or angular distance in the radial plane from section to section when seen in the projection onto the radial plane. Thus, for example, said angular interval will be 90° for two sets of crossing channels, and will be 60° for three sets of crossing channels, while it will be 45° for four sets of crossing channels, and so on. However, once again, it is of principal importance that the crossing channels do not intersect each other, that is to say that crossing takes place in different spacial planes. In combination with the effect of the hollow cavities preferably spherical cavities, such a geometric arrangement renders the rubber buffer material quite soft due to a highly macroscopic homogeneous distribution of load stress over all available channels and cavities, while simultaneously hardly weakening the strength of the rubber block. Preferably at least five to ten planes of mutually parallel channels intersecting associated cavities are staggered one upon the other in the direction of the load vector.

In contrast to irregularily foamed rubber material on the one hand and also in contrast to rubber spring elements having large cavities, especially in contrast to those elements having additionally intersecting smaller channels communicating between the larger holes (e.g., in mattresses), the spring element of the invention even under fairly high loads are free from suffering from buckling effects, it is a kinking of the walls between the pores or large cavities, and especially free from subsidence, since the material left for building up the material structure of the spring element is far less weakened as it is with microspongy foamed bodies on the one hand and bodies having large cavities therein, on the other hand. Simultaneously, however, by allowing the material to deform and deflect inside its very body, namely right in and into the cavities and channels, the spring element of the invention also is by far softer than a comparative bulk rubber buffer element.

Additionally, an unexpectedly good acoustic insulation with respect to sound waves propagating in the resilient block material is also obtained in the spring element of the invention by pronounced scattering effects in the hollow cavities or hollow structure elements in the resilient block of the spring element of the present invention.

According to a particularly preferred embodiment of the invention the channels interspersing the resilient elastomer block of the spring element are constructed in the form of two sets of channels, which are respectively arranged three-dimensionally among themselves with an equal mutual interval and mutually parallel interspersing the entire block. The two sets of channels are arranged crossing mutually at right angles but in different planes, that is to say at different heights of the block, so that they intersperse each other without mutually intersecting. This is a prominent feature of the present invention, because it gives rise to a mechanical strengthening of the bulk structure of the elastomer block. Each of the channels intersperses centrally a plurality of preferably spherical cavities, which are arranged at such an equal mutual interval relative to the channel axis that all the cavities of both sets of channels present in the elastomer block conjointly form a body-centered cubic lattice. The sets of channels are arranged so that the cavities of each one of the sets of channels form one of the two simple cubic sub-lattices of which a body-centered cubic lattic as the present one as a whole is composed. In this spring element conformed in such manner, an optimum distribution of stress under the action of a heavy load under compression over the entire spring element is achieved, so that the spring element exhibits an extraordinarily flat spring characteristic with a significantly wide proportionality range. A spring element conformed in such manner is not only softer in its spring behaviour compared to the spring elements of the art, but it is far superior to these known spring elements as its useful duty life is concerned due to the lower local stress concentration in the material.

Especially good operational action of the spring element is obtained, when the spring element is interspersed by a plurality of sets of channels respectively mutually plane-parallel with respectively mutually parallel channels, of which each individual set of channels defines a plane and the operational load acting in the sense of a compression upon the spring element acts at least substantially at right angles to the planes of the sets of channels. The individual sets of channels are stacked relative to their channel axes mutually crossing, but not mutually intersecting, as already explained above. Particularly, an alignment of the channel axes from one to the next plane of sets of channels has been found advantageous so that, as seen in the direction of stacking the axes of the channels of the individual planes of sets of channels are respectively rotated mutually by the same angular amount from one to the following set of channels, and therefore form a helicoidally progressive configuration. From the acoustic damping standpoint this arrangement achieves the substantial advantage that virtually no continuous strands of material, short-circuit channels so to speak, which can act as a bridges for the propagation of acoustic waves, are left standing in the direction at right angles to the planes of sets of channels, that is to say in the direction of the load vector.

The spring element according to the invention is preferably produced by constructing in a mold a mold cavity which corresponds to the external contour of the spring element to be produced. This mold cavity is interspersed with molding cores or sets of molding cores which are at least substantially of bar-shaped construction and exhibit at regular intervals thickened portions, the external contour of which corresponds to the internal contour of the cavities to be formed in the block. The molding cores may be made of steel as reusable cores, or may be made of plastics as "lost" molding cores.

The mold fitted with the sets of molding cores is then charged in a manner known per se by compression molding or injection molding with the plasticized elastomer compound, whether the latter is uncrosslinked, precrosslinked, or otherwise plastified. The elastomer is then cured by crosslinking or otherwise hardened. The hardened elastomer element then is removed from the mold cavity together with the molding cores still embedded in the formed elastomer block, that is to say taken out of the cavity of the mold. This removal, of course, may also be effected, for example, in that the mold sections are removed. The molding cores are then removed from the thus obtained elastomer block, which is still interspersed by the sets of molding cores, either nondestructively by pulling, or otherwise, destructively, when using lost molding cores. The resulting spring element may be used directly as it comes out of the mold, or, optionally, after further cutting operation.

BRIEF DESCRIPTION OF THE DRAWINGS

The invention is explained more fully below with reference to an embodiment of the invention referring to the drawing, in which the position of the planes of section is designated by the Miller indices customary in crystallography. In the drawing.

DETAILED DESCRIPTION OF THE INVENTION

Figure 1:
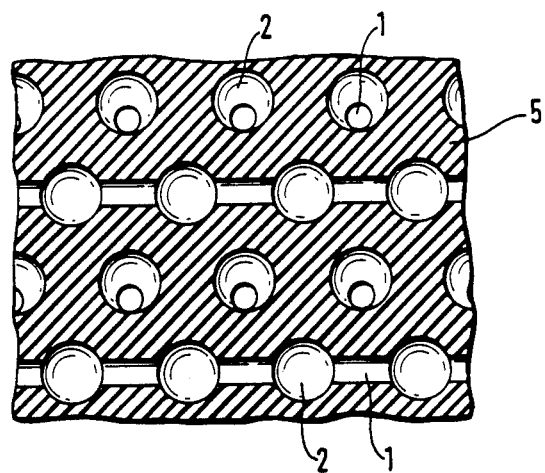
FIG. 1 shows diagramatically an embodiment of a spring element according to the invention with a body-centered cubic arrangement of the cavities.
Figure 2:
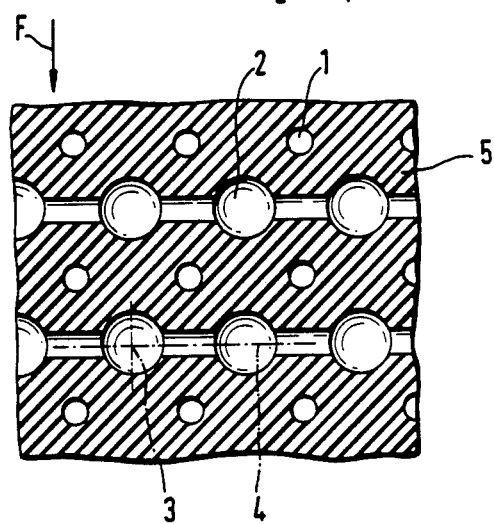
FIG. 2 shows diagramatically a section of the type illustrated in FIG. 1.

FIGS. 1 and 2 each show diagramatically a section through a spring element, in which a block 5 made of a resilient material, natural rubber with a hardness of 35 Shore A in this case, is interspersed by two sets of cylindrical channels 1.

These two sets of cylindrical channels are arranged mutually at right angles in one plane, but mutually staggered in the direction of the normal to this plane in such a way the channels do not intersect. The channels of each set are respectively oriented mutually parallel and arranged distributed at the same mutual space interval at least substantially over the total volume of the block 5. Each of the channels 1 intersperses a plurality of spherical cavities 2, the diameter of which is greater than the diameter of the channel 1. The spherical cavities 2 and the channels 1 are respectively arranged mutually so that the median axis 4 of the cylindrical channels 1 passes through the centers 3 of the spherical cavities 2. The spherical cavities 2 are arranged mutually equidistant relative to the axis 4 of each channel 1. In the preferred embodiment of the invention illustrated here, the mutual interval of two adjacent spherical cavities which are intersected by one and the same cylindrical channel is equal to the interval of two adjacent mutually parallel channels 1 of the same set of channels. In other words, the spherical cavities of each set of channels form among themselves a simple cubic sub-lattice, whilst the two sub-lattices of each of the two sets are mutually staggered and mutually interlaced so that all the spherical cavities 2 distributed in the block 5 form among themselves a body-centered cubic lattice. Expressed in the notation of Miller indices customary in crystallography, FIG. 1 shows the plane of section and FIG. 2 the plane of section of this body-centered cubic lattice of the cavities 2 in the block 5 of the spring element. FIG. 1 therefore shows a section in the direction of the diagonal surface positioned at right angles to the base surface of the lattice cube, whereas the section shown in FIG. 2 corresponds to a lateral view of the unit cell of the lattice.

FIG. 3 again shows as a detail in a diagrammatical three-dimensional view the three-dimensional arrangement of the two mutually penetrating sets of channels 1 with the cavities 2, whilst the unit cell 5 of the body-centered cubic lattice of the cavities 2 is indicated.

Figure 3:
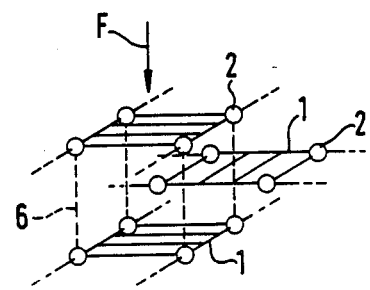
FIG. 3 shows in the spring element illustrated in FIGS. 1 and 2, diagramatically, the three-dimensional arrangement of the channels and cavities.

The preferred direction selected for the vector of the operational load to be sprung according to the intended use is indicated by the arrow F in FIGS. 2 and 3. This direction is oriented at 45° to the plane of the drawing in the use of a spring element oriented so as to exhibit the section shown in FIG. 1.

We claim:

1. A spring element, comprising a block made of a resilient elastomer material interspersed with cylindrical or prismatic channels, said channels intersecting cavities formed in the block, a largest inside cross-section of said cavities in a plane located at right angles to the channel axis being greater than the cross-section of the channels in that plane, the channels intersecting the cavities so that the centers of the cavities lie substantially upon the axis of the channels and substantially all the cavities intersected by one respective channel are mutually spaced from each other at generally equidistant intervals, wherein the block is interspersed by at least two sets of generally parallel channels which cross each other three-dimensionally in different generally horizontal planes without intersecting such that the centers of the cavities form a body-centered cubic lattice in the block.

2. A spring element as claimed in claim 1, wherein the block (5) is interspersed by two sets of mutually parallel channels (1) distributed uniformly in space, the sets crossing each other at least substantially at right angles in space, but do not intersect.

3. A spring element as claimed in claim 1, wherein the channels (1) and cavities (2) are substantially entirely filled with a damping fluid.

4. A spring element as claimed in claim 1, wherein the channels are open at least at one end.

5. The spring element of claim 1, further including a vehicle body and an automotive vehicle engine connected thereto by means of said spring element.

* * * * *